US011178039B2

United States Patent
Chen et al.

(10) Patent No.: US 11,178,039 B2
(45) Date of Patent: Nov. 16, 2021

(54) ELECTING DESIGNATED FORWARDER (71) Applicant: New H3C Technologies Co., Ltd., Zhejiang (CN)

(72) Inventors: Jian Chen, Beijing (CN); Jinrong Ye, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/648,647

(22) PCT Filed: Nov. 22, 2018

(86) PCT No.: PCT/CN2018/116862
§ 371 (c)(1),
(2) Date: Mar. 18, 2020

(87) PCT Pub. No.: WO2019/101118
PCT Pub. Date: May 31, 2019

(65) Prior Publication Data
US 2020/0280507 A1    Sep. 3, 2020

(30) Foreign Application Priority Data
Nov. 27, 2017 (CN) .......................... 201711202907.6

(51) Int. Cl.
*H04L 12/751* (2013.01)
(52) U.S. Cl.
CPC .................................. *H04L 45/02* (2013.01)
(58) Field of Classification Search
USPC ........................................................ 370/251
See application file for complete search history.

(56) References Cited

U.S. PATENT DOCUMENTS 7,426,577 B2 * 9/2008 Bardzil ................... H04L 41/12
                                                            709/238
7,583,665 B1 * 9/2009 Duncan .............. H04Q 11/0478
                                                            370/389
(Continued)

FOREIGN PATENT DOCUMENTS

CN        102739519 A     10/2012
CN        102769562 A     11/2012
(Continued)

OTHER PUBLICATIONS

State Intellectual Property Office of the People's Republic of China, Office Action and Search Report Issued in Application No. 201711202907.6, dated Jun. 15, 2020, 10 pages. (Submitted with Machine Translation).

(Continued)

*Primary Examiner* — Anthony Mejia
(74) *Attorney, Agent, or Firm* — McCoy Russell LLP (57) ABSTRACT

A method and device for electing a designated forwarder (DF) are provided. According to the method, NLRI sent by a second (PE) of the PEs is received, and a first election policy set supported by the second PE, and a first priority corresponding to each election policy in the first election policy set is parsed out. A target election policy is determined by using a second election policy set supported by a first PE, a second priority corresponding to each election policy in the second election policy set, the first election policy set supported by the second PE and the first priority corresponding to each election policy in the first election policy set. A DF is elected from the first PE and the second PE by using the target election policy.

10 Claims, 3 Drawing Sheets

(56) References Cited

U.S. PATENT DOCUMENTS

| | | | |
|---|---|---|---|
| 8,099,483 B2* | 1/2012 | Smith | H04L 45/28 709/223 |
| 8,665,883 B2 | 3/2014 | Balus et al. | |
| 8,780,699 B1* | 7/2014 | Hasan | H04L 1/22 370/219 |
| 9,735,983 B1 | 8/2017 | Sharma et al. | |
| 10,091,056 B1* | 10/2018 | Cosgrove | H04L 45/02 |
| 2007/0019634 A1* | 1/2007 | Fisher | H04M 3/42221 370/352 |
| 2007/0047446 A1* | 3/2007 | Dalal | H04L 47/31 370/237 |
| 2007/0121524 A1* | 5/2007 | Rangarajan | H04L 45/02 370/252 |
| 2009/0168789 A1* | 7/2009 | Wood | H04L 45/02 370/402 |
| 2009/0262660 A1* | 10/2009 | Watari | H04L 45/021 370/253 |
| 2009/0316623 A1* | 12/2009 | Pettersson | H04L 45/02 370/328 |
| 2012/0201124 A1 | 8/2012 | Marques et al. | |
| 2014/0344331 A1* | 11/2014 | Johns | H04L 67/322 709/203 |
| 2015/0295815 A1* | 10/2015 | Retana | H04L 45/26 709/242 |
| 2016/0112460 A1* | 4/2016 | Li | H04L 45/02 726/1 |
| 2016/0134482 A1* | 5/2016 | Beshai | H04L 45/02 370/254 |
| 2016/0134591 A1* | 5/2016 | Liao | H04L 45/14 726/15 |
| 2016/0261487 A1 | 9/2016 | Singh et al. | |
| 2017/0063966 A1* | 3/2017 | Kalish | G06F 9/45516 |
| 2017/0141963 A1 | 5/2017 | Chalapathy et al. | |
| 2017/0257307 A1* | 9/2017 | Lu | H04L 45/02 |
| 2018/0054391 A1 | 2/2018 | Jain et al. | |
| 2018/0077050 A1* | 3/2018 | Tiruveedhula | H04L 45/24 |
| 2020/0014623 A1* | 1/2020 | Wang | H04L 12/46 |

FOREIGN PATENT DOCUMENTS

| | | | |
|---|---|---|---|
| CN | 103780437 A | 5/2014 | |
| CN | 104253759 A | 12/2014 | |
| CN | 105790996 A | 7/2016 | |
| CN | 105939257 A | 9/2016 | |
| CN | 106713005 A | 5/2017 | |
| CN | 106936682 A | 7/2017 | |
| JP | 2011120083 A | 6/2011 | |
| WO | 2014087500 A1 | 6/2014 | |

OTHER PUBLICATIONS

State Intellectual Property Office of the People's Republic of China, Decision of Rejection Issued in Application No. 201711202907.6, dated Dec. 17, 2019, 16 pages. (Submitted with Partial Translation).

ISA State Intellectual Property Office of the People's Republic of China, International Search Report Issued in Application No. PCT/CN2018/116862, dated Jan. 31, 2019, WIPO, 4 pages.

Sajassi, A. et al., "BGP MPLS-Based Ethernet VPN," Internet Engineering Task Force (IETF) Website, Request for Comments: 7432, Category: Standards Track, ISSN: 2070-1721, Available Online at https://tools.ietf.org/html/rfc7432, Feb. 18, 2015, 56 pages.

Hao, W. et al., "Centralized EVPN DF Election draft-hao-bess-evpn-centralized-df-00.txt," Internet Engineering Task Force (IETF) Website, BESS Working Group Internet Draft, Intended status: Standard Track, Available Online at https://tools.ietf.org/html/draft-hao-bess-evpn-centralized-df-00, Feb. 15, 2016, 10 pages.

Rabadan, J. et al., "Preference-based EVPN DF Election draft-ietf-bess-evpn-pref-df-00," Internet Engineering Task Force (IETF) Website, BESS Working Group Internet Draft, Intended Status: Standards Track, Available Online at https://tools.ietf.org/html/draft-ietf-bess-evpn-pref-df-00, Jun. 21, 2017, 12 pages.

Mohanty, S. et al., "A new Designated Forwarder Election for the EVPN draft-ietf-bess-evpn-df-election-03," Internet Engineering Task Force (IETF) Website, BESS Working Group Internet Draft, Intended status: Standards Track, Available Online at https://tools.ietf.org/html/draft-ietf-bess-evpn-df-election-03, Oct. 10, 2017, 15 pages.

Chen, J., "EVPN DF Election Algorithm Selection draft-chen-bess-evpn-df-algorithm-selection-00," Internet Engineering Task Force (IETF) Website, BESS Working Group Internet Draft, Intended status: Standards Track, Available Online at https://tools.ietf.org/html/draft-chen-bess-evpn-df-algorithm-selection-00, Nov. 28, 2017, 6 pages.

ISA State Intellectual Property Office of the People's Republic of China, Written Opinion of the International Searching Authority Issued in Application No. PCT/CN2018/116862, Jan. 31, 2019, WIPO, 8 pages.

European Patent Office, Extended European Search Report Issued in Application No. 18881438.8, Sep. 11, 2020, Germany, 12 pages.

* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type=0x06    | Sub-Type(TBD) | DF Type(One Octet) |Reserved=0 |
+-+-+-+-+-+-+-+-+-+-+-+-+-+-+-+-+-+-+-+-+-+-+-+-+-+-+-+-+-+-+-+-+
| DF pref          |       Reserved = 0                         |
+-+-+-+-+-+-+-+-+-+-+-+-+-+-+-+-+-+-+-+-+-+-+-+-+-+-+-+-+-+-+-+-+
```

ELECTING DESIGNATED FORWARDER

CROSS-REFERENCE TO RELATED APPLICATIONS

The present application is a U.S. National Phase of International Patent Application Serial No. PCT/CN2018/116862 entitled "ELECTING DESIGNATED FORWARDER," filed on Nov. 22, 2018. International Patent Application Serial No. PCT/CN2018/116862 claims priority to Chinese Patent Application No. 201711202907.6 entitled filed on Nov. 27, 2017. The entire contents of each of the above-referenced applications are hereby incorporated by reference for all purposes.

BACKGROUND

VXLAN (Virtual eXtensible Local Area Network) is a Layer 2 VPN (Virtual Private Network) technology using a MAC (Media Access Control) in UDP (User Datagram Protocol) encapsulation based on an IP network. VXLAN can provide Layer 2 interconnection for distributed physical sites based on existing service providers or enterprise IP networks, and can provide service isolation for different tenants.

EVPN (Ethernet Virtual Private Network) is a Layer 2 VPN technology, where a control plane advertises routing information by MP-BGP (MultiProtocol-Border Gateway Protocol), and a data plane transmits packets in a VXLAN mode.

EVPN multi-homing technology supports a CE (Customer Edge) connecting multiple PEs (Provider Edges). For example, CE1 is connected to PE1, PE2, and PE3, respectively. When CE2 sends a packet to CE1, the packet is sent to PE1, PE2, and PE3, and PE1, PE2, and PE3 send the packet to CE1. Therefore, the CE1 receives multiple identical packets.

To solve the above problem, a DF (Designated Forwarder) can be elected among PE1, PE2, and PE3. Assume that PE1 is elected as the DF, PE1 will send the packet to CE1, but PE2 and PE3 will not send the packet to CE1, therefore preventing CE1 from receiving multiple identical packets.

However, each of PE1, PE2, and PE3 uses its locally configured election policy to elect the DF. Assume that the PE1 uses the locally configured election policy 1 to elect the DF as PE1, and the PE2 and the PE3 use the locally configured election policy 2 to elect the DF to be the PE2. Thus, both PE1 and PE2 are elected as a DF, resulting in erroneous election results.

BRIEF DESCRIPTION OF THE DRAWINGS

In order to more clearly illustrate the examples of the present disclosure, the drawings used in the examples of the present disclosure will be briefly described below. Obviously, the drawings in the following description are only some of the examples described in the present disclosure, and other drawings can be obtained by those skilled in the art from the drawings of the examples of the present disclosure.

DETAILED DESCRIPTION OF THE EMBODIMENTS

The terms used in the examples of the present disclosure are for the purpose of describing the specific examples, and are not limiting. The singular forms "a", "said" and "the" are intended to include a plural form, otherwise explicitly indicating other meaning in the context. It also should be understood that the term "and/or" as used herein refers to any and all possible combinations of one or more of the associated listed items.

It should be understood that although the terms "first", "second", "third", etc. may be used to describe various information in the examples of the present disclosure, the information should not be limited to these terms. These terms are only used to distinguish the same type of information from one another. For example, the first information may also be referred to as the second information without departing from the scope of the present disclosure. Similarly, the second information may also be referred to as the first information. Depending on the context, the word "if" may be interpreted to mean "when" or "in response to the determination".

Figure 1:
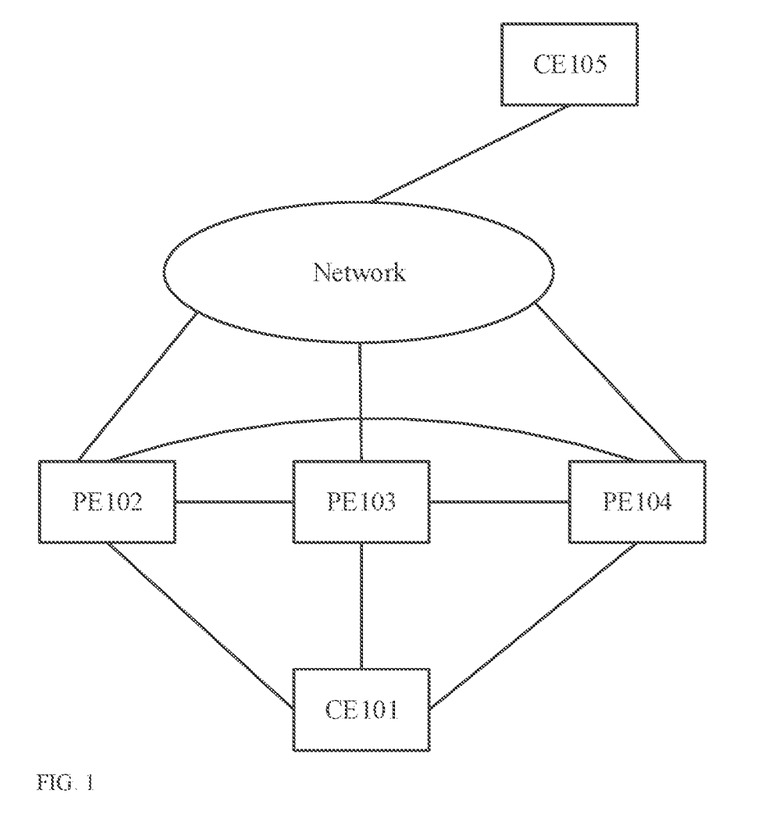
FIG. 1 is a schematic diagram of an application scenario according to an example of the present disclosure.

A DF election method is proposed in the example of the present disclosure. The method can be applied to an EVPN multi-homing network. The EVPN multi-homing is a technology for supporting a CE connecting multiple PEs. As shown in FIG. 1, the application scenario of the example of the present disclosure is as follows: CE 101 is connected to PE 102, PE 103, and PE 104 respectively, that is, CE 101 is multi-homed to PE 102, PE 103, and PE 104. In FIG. 1, take the CE 101 is multi-homed to three PEs as an example for description. In practical applications, the CE 101 can also be multi-homed to more or fewer PEs.

In the EVPN multi-homed network, packets sent from CE 105 to CE 101 (such as broadcast packets and multicast packets) can be sent to PE 102, PE 103, and PE 104, and PE 102, PE 103, and PE 104 can send the packets to CE 101, thereby causing the CE 101 to receive multiple identical packets.

In order to solve the above problem, a DF can be elected among the PE 102, the PE 103, and the PE 104. Assume that the PE 102 is elected as the DF, the PE 102 can send packets to the CE 101, and the PE 103 and PE 104 do not send the packets to the CE 101. It can be avoided that the CE 101 receives multiple identical packets.

The DF election method proposed in the example of the present disclosure can be applied to a first PE, that is, the first PE can use the DF election method to elect only one DF from all the PEs to which the CE is multi-homed. The first PE may be any PE used to provide a multi-homing access for the CE.

For example, for PE 102, PE 103, and PE 104 to which CE 101 is multi-homed, PE 102 is the first PE, PE 103 and PE 104 are the second PE, and PE 102 elects the DF from PE 102, PE 103, and PE 104. For PE 103, PE 103 is the first PE, PE 102 and PE 104 are the second PE, and PE 103 elects the DF from PE 102, PE 103, and PE 104. For PE 104, PE 104 is the first PE, PE 102 and PE 103 are the second PE, and PE 104 elects the DF from PE 102, PE 103, and PE 104.

To elect a DF from all the PEs to which the CE is multi-homed, an election policy may be configured on each of the PEs to enable the PE to elect the DF according to the election policy. In the subsequent process, the PE elects the DF according to the election policy will be described in details. The number of the election policies configured on the PE is not limited. The process of configuring the election policy for each PE is independent to each other. For example, when the election policy is configured on PE 102, it is irrelevant to which election policies exist on PE 103/PE 104. The configuration for the election policy may be performed on PE 102 as required.

When an election policy is configured on a PE, a priority of the election policy may be also set. The priorities of the election policies can be the same or different. The priorities of the election policies can be configured according to actual requirements.

Each of the PEs supports a default election policy. The priority of the default election policy can be 0. In the actual application, of course, the priority of the default election policy can be modified, for example, to 50.

In a multi-homed network, links through which the same CE accesses the PEs may be identified by the same ES (Ethernet Segment). Therefore, different CEs can be distinguished by different ES identifiers. For example, since CE 101 is multi-homed to PE 102, PE 103, and PE 104, an ES identifier 1 can be configured for CE 101 on PE 102, PE 103, and PE 104. For example, assume that CE 106 (not shown in the figure) is multi-homed to PE 102 and PE 103, an ES identifier 2 can be configured for CE 106 on PE 102 and PE 103.

In an example, an election policy can be configured for a PE in a way that all CEs that are multi-homed to the PE can use the election policy. For example, an election policy 1 and an election policy 2 are configured on PE 102, which can be used by both CE 101 and CE 106 that are multi-homed to PE 102.

In another example, an election policy may be configured for a CE on a PE in a way that the CE multi-homed to the PE can use the election policy. For example, on PE 102, the election policy 1 and the election policy 2 are configured for CE 101. Thus, CE 101 multi-homed to PE 102 can use the election policy 1 and the election policy 2. On PE 102, the election policy 1, the election policy 2, and an election policy 3 can be configured for CE 106. Thus, CE 106 multi-homed to PE 102 can use the election policy 1, the election policy 2, and the election policy 3.

Take an example of configuring an election policy for a CE, as shown in FIG. 1, CE 101 is multi-homed to PE 102, PE 103, and PE 104, therefore, the configurations on PE 102 can include, but is not limited to, the election policy 1 and a priority 200 corresponding to the election policy 1; an election policy 2, a priority 200 corresponding to the election policy 2; the election policy 3, a priority 100 corresponding to the election policy 3; an election policy 0, a priority 0 corresponding to the election policy 0; ES identifier 1 corresponding to CE 101. The configurations on PE 103 may include, but is not limited to, the election policy 1, a priority 150 corresponding to the election policy 1; the election policy 2, a priority 300 corresponding to the election policy 2; an election policy 4, a priority 100 corresponding to the election policy 4; the election policy 0, the priority 0 corresponding to the election policy 0; and the ES identifier 1 corresponding to CE 101. The configurations on PE 104 may include, but is not limited to, the election policy 1, a priority 180 corresponding to the election policy 1; the election policy 2, a priority 200 corresponding to the election policy 2; the election policy 0, and a priority 0 corresponding to the election policy 0; the ES identifier 1 corresponding to CE 101, etc. As CE 106 is multi-homed to PE 102 and PE 103, the configurations on PE 102 for CE 106 includes, but is not limited to, the election policy 1, a priority 220 corresponding to the election policy 1; the election policy 3, and a priority 180 corresponding to the election policy 3; the election policy 0, a priority 0 corresponding to the election policy 0; and the ES identifier 2 corresponding to CE 106, etc. The configurations on PE 103 for CE 106 includes, but is not limited to, the election policy 1, a priority 150 corresponding to the election policy 1; the election policy 2, a priority 300 corresponding to the election policy 2; the election policy 0, the priority 0 corresponding to the election policy 0; the ES identifier 2 corresponding to CE 106, etc.

In the above device configurations, the election policy 0 may be a default election policy supported by all PEs.

In an example, the device configurations on each PE may also include a VSI (Virtual Switch Interface), an RD (Route Distinguisher), an RT ((Route Target), a VXLAN ID, or other content, which is not restricted.

Of course, the election policy and the priority corresponding to the election policy in the above device configurations are only an example. In actual applications, the election policy and the priority can be configured as required, which is not restricted.

In an example, for each of the PEs to which the CE is multi-homed, the PE may be the first PE, and the other PEs to which the CE is multi-homed may be the second PE, and each first PE may send Network layer reachability information (NLRI) to the second PE. Specifically, the first PE may obtain an election policy set supported by the first PE (i.e., a set of election policies supported by the first PE) and a priority corresponding to each election policy in the election policy set. Then, the first PE may send NLRI to the second PE, where the NLRI may carry the election policy set and the priority corresponding to each election policy in the election policy set.

The default election policy supported by the first PE may or may not be included in the election policy set. For example, when the priority of the default election policy is 0, it may not be included in the election policy set. When the priority of the default election policy is not 0, it may be included in the election policy set. For convenience of description, in the subsequent process, the default election policy is not included in the election policy set as an example.

For example, PE 102 can send NLRI to PE 103 and PE 104. The election policy set carried in the NLRI can include the election policy 1, the election policy 2, and the election policy 3. Moreover, the NLRI can also carry the priority 200 corresponding to the election policy 1, the priority 200 corresponding to the election policy 2, and the priority 100 corresponding to the election policy 3. In addition, PE 103 may send NLRI to PE 102 and PE 104. The election policy set carried in the NLRI may include the election policy 1, the election policy 2, and the election policy 4; and the NLRI may also carry the priority 150 corresponding to the election policy 1, the priority 300 corresponding to the election policy 2, and the priority 100 corresponding to the election policy 4. In addition, PE 104 can send NLRI to PE 102 and PE 103. The election policy set carried in the NLRI can include the election policy 1 and the election policy 2, and the NLRI can also carry the priority 180 corresponding to the election policy 1, and the priority 200 corresponding to the election policy 2.

Each PE can maintain an ES peer list according to the received NLRI, the ES peer list including identifiers of multiple PEs (including the PE itself) connected to the same CE, for example, the IP addresses of the PEs. For example, for PE 102, the ES peer list maintained by PE 102 includes the identifiers of PE 103 and PE 104. Similarly, the ES peer list maintained by the PE 103 includes the identifiers of PE 102 and PE 104. Therefore, PE 103 may send NLRI to PE 102 and PE 104. The ES peer list maintained by PE 104 includes the identifiers of PE 102 and PE 103. Therefore, PE 104 may send NLRI to PE 102 and PE 103.

The NLRI sent by the first PE to the second PE may also carry the ES identifier corresponding to the CE. For example, the NLRI may also carry the ES identifier 1 corresponding to CE 101.

Figure 2A:
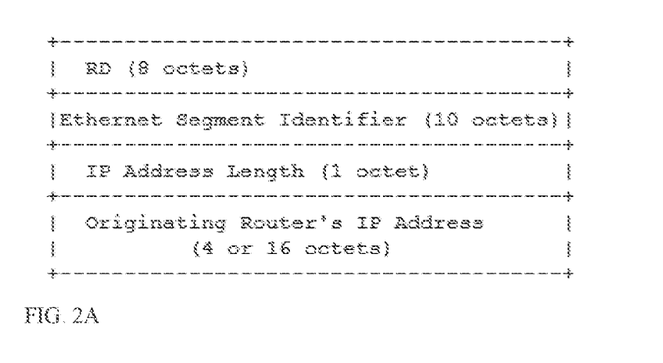
FIGS. 2A and 2B are schematic diagrams showing a message format according to an example of the present disclosure.

As shown in FIG. 2A, as a NLRI example, the NLRI may be a message for advertising an Ethernet segment route in an EVPN based on a BGP protocol. As shown in FIG. 2A, the Ethernet Segment Identifier field is used to carry the ES identifier, such as the ES identifier 1 described above.

In an example, the NLRI may include, but is not limited to, at least one extended community attribute (Election Extended Community), and the number of extended community attributes is the same as the number of election policies in the election policy set, and each election policy corresponds to an extended community attribute. Further, the extended community attribute corresponding to the election policy may include, but is not limited to, the DF type (DF Type) field and the DF priority (DF pref) field. The DF type field is used to carry the type of the election policy, and the DF priority field is used to carry the priority corresponding to the election policy.

Figure 2B:
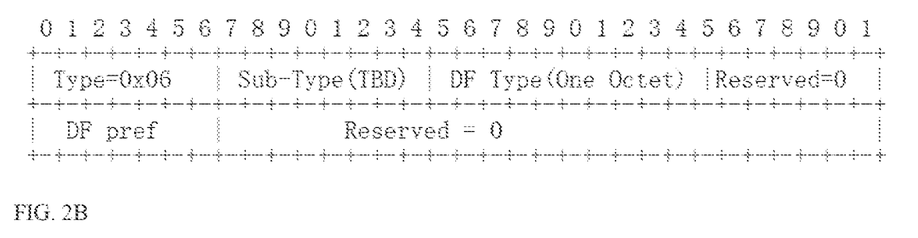

As shown in FIG. 2B, as an extended community attribute example, the DF Type field is used to carry the type of the election policy, and the DF pref field is used to carry the priority corresponding to the election policy. For example, the NLRI sent by PE 102 may carry three extended community attributes. The DF Type field of the first extended community attribute is the election policy 1, and the DF pref field is 200; the DF Type field of the second extended community attribute is the election policy 2, and the DF pref field is 200; the DF Type field of the third extended community attribute is the election policy 3, and the DF pref field is 100. The NLRI sent by PE 103/PE 104 is similar to this, and is not mentioned here.

Figure 3:
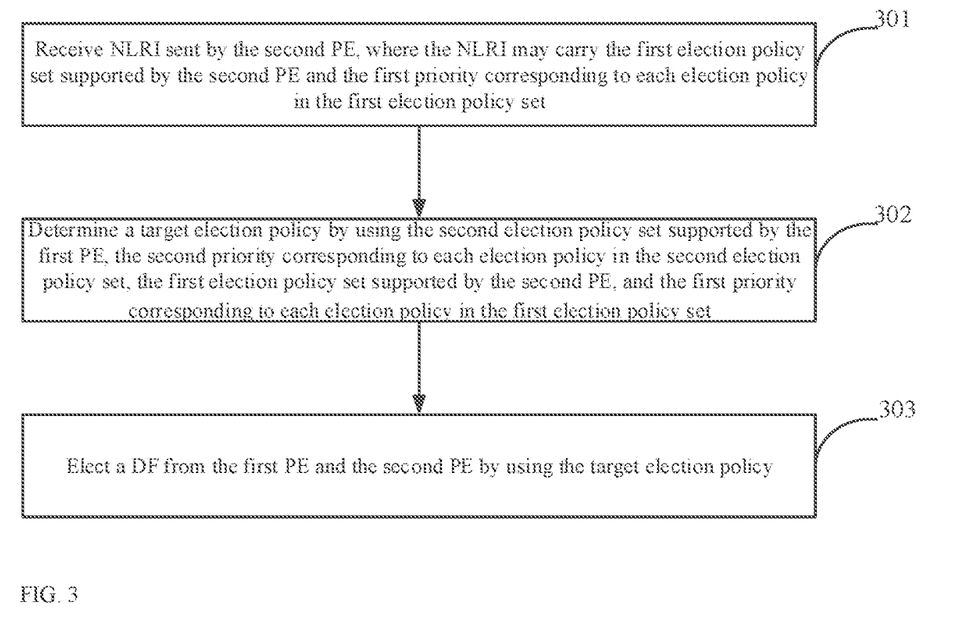
FIG. 3 is a flowchart of a DF election method according to an example of the present disclosure.

In the above application scenario, as shown in FIG. 3, which is a flowchart of the DF election method proposed in the example of the present disclosure, the method may be applied to the first PE, and the method may include the following blocks.

Block 301: NLRI sent by the second PE is received, where the NLRI may carry the first election policy set supported by the second PE and the first priority corresponding to each election policy in the first election policy set. For convenience, the set of election policies supported by the second PE is referred to as a first election policy set, and the priority corresponding to each election policy in the first election policy set is referred to as a first priority.

Block 302: the second election policy set supported by the first PE, the second priority corresponding to each election policy in the second election policy set, the first election policy set supported by the second PE, and the first priority corresponding to each election policy in the first election policy set are used to determine the target election policy.

For the sake of convenience, the set of election policies supported by the first PE is referred to as a second election policy set, and the priority corresponding to each election policy in the second election policy set is referred to as a second priority.

In an example, the process of "the second election policy set supported by the first PE, the second priority corresponding to each election policy in the second election policy set, the first election policy set supported by the second PE, and the first priority corresponding to each election policy in the first election policy set are used to determine the target election policy" may include, but is not limited to, the following manner: the first PE determines an intersection of the second election policy set and the first election policy set; then, for each election policy in the intersection, the first PE uses the first priority and the second priority corresponding to the election policy to determine a target priority corresponding to the election policy; the first PE may determine an election policy with the highest target priority as the target election policy.

The process of determining the target priority corresponding to the election policy by using the first priority and the second priority corresponding to the election policy may include, but is not limited to, mode 1: if the first priority is less than or equal to the second priority, the first priority may be determined as the target priority corresponding to the election policy; or, if the first priority is greater than the second priority, the second priority may be determined as the target priority corresponding to the election policy. Mode 2: if the first priority is less than or equal to the second priority, the second priority may be determined as a target priority corresponding to the election policy; or, if the first priority is greater than the second priority, the first priority may be determined as the target priority corresponding to the election policy. For convenience of description, the mode 1 is used as an example for description subsequently.

After determining the target priority corresponding to each election policy in the intersection of the first election policy set and the second election policy set, the election policy with the highest target priority may be determined as the target election policy. If the target priorities corresponding to the at least two election policies are the same, and the two target priorities are the highest, the target election policy may be selected from the at least two election policies, for example, according to the identifiers of the election policies. For example, the identifiers of the at least two election policies are compared in size, and the election policy with the smallest identifier may be determined as the target election policy. For example, when the election policy identifiers are the election policy 1 and the election policy 2, the election policy 1 may be determined as the target election policy; or, the election policy with the largest identifier may be determined as the target election policy, for example, the election policy 2 is determined as the target election policy. The way in which the target election policy is selected from the at least two election strategies is not limited. In addition, in the above, the election policy with the highest target priority is used as the target election policy. However, this is not restrictive. The election policy with the lowest target priority may be also used as the target election policy, or other options may be adopted, as long as the selection mode is kept consistent during the whole selection process.

In an example, if the intersection of the second election policy set and the first election policy set is empty, the first PE may also obtain a specified election policy (such as the default election policy described above), and determine the specified election policy as the target election policy.

The following describes the process of determining the target election policy in combination with specific application scenarios.

When PE 102 is the first PE, the second election policy set supported by PE 102 may include the election policy 1, the election policy 2, and the election policy 3; and the second priority corresponding to the election policy 1 is 200, and the second priority corresponding to the election policy 2 is 200, and the second priority corresponding to the election policy 3 is 100. In addition, PE 102 parses out the first election policy set supported by the PE 103 from the NLRI sent by PE 103. The first election policy set may include the election policy 1, the election policy 2, and the election policy 4, and the first priority corresponding to the election policy 1 is 150, the first priority corresponding to the election policy 2 is 300, and the first priority corresponding to the election policy 4 is 100. In addition, PE 102 parses out the first election policy set supported by PE 104 from the NLRI sent by PE 104. The first election policy set may include the election policy 1 and the election policy 2, and the first priority corresponding to the election policy 1 is 180, and the first priority corresponding to election policy 2 is 200.

PE 102 determines that both the election policy 1 and the election policy 2 exist in each of the second election policy set supported by PE 102 and the first election policy set supported by PE 103 and the first election policy set supported by PE 104. For the election policy 1, since the priority of the election policy 1 in each election policy set is 200, 150, and 180, respectively, the minimum priority 150 is determined as the target priority of the election policy 1. For the election policy 2, since the priority of the election policy 2 in each election policy set is 200, 300, and 200, respectively, the minimum priority 200 is determined as the target priority of the election policy 2. Since the target priority of the election policy 1 is 150 and the target priority of the election policy 2 is 200, the election policy 2 with the highest target priority is determined as the target election policy.

When PE 103/PE 104 is the first PE, the processing flow is similar to that of the PE 102, which is not described in details. Finally, PE 103/PE 104 can also determine the election policy 2 as the target election policy.

In an example, the process of "the second election policy set supported by the first PE, the second priority corresponding to each election policy in the second election policy set, the first election policy set supported by the second PE, and the first priority corresponding to each election policy in the first election policy set are used to determine the target election policy" may include, but is not limited to: if the NLRI carries the ES identifier of the CE connected to the second PE, an election policy corresponding to the ES identifier in the election policies supported by the first PE is obtained, and the obtained election policy is added to the second election policy set; the second election policy set, the second priority corresponding to each election policy of the second election policy set, the first election policy set supported by the second PE, and the first priority corresponding to each election policy in the first election policy set are used to determine the target election policy; if the NLRI does not carry the ES identifier, it is unnecessary to determine the target election policy based on the NLRI.

If an election policy is configured for the first PE, and all CEs multi-homed to the first PE may use the election policy. Then, in order to obtain an election policy corresponding to the ES identifier from the election policies supported by the first PE, all election policies configured on the first PE may be determined as the election policy corresponding to the ES identifier.

If an election policy is configured for a CE multi-homed to the first PE on the first PE, the CE may use the election policy. Then, in order to obtain an election policy corresponding to the ES identifier from the election policies supported by the first PE, the election policy configured for the CE corresponding to the ES identifier by the first PE may be determined as the election policy corresponding to the ES identifier. For example, when the first PE configures the election policy 1 and the election policy 2 for CE 101, the mapping between the ES identifier 1 of CE 101 and the election policy 1 and the election policy 2 is recorded. For example, the above device configurations may include the mapping, which is not described in details. Therefore, if the NLRI carries the ES identifier 1, the election policy 1 and the election policy 2 corresponding to the ES identifier 1 can be obtained from the election policies supported by the first PE.

From the above, after receiving the NLRI, the first PE may parse out the ES identifier from the NLRI, and obtain an election policy corresponding to the ES identifier from the election policies supported by the first PE, and then determine the target election policy based on the obtained election policy. Alternatively, after receiving the NLRI, the first PE may directly determine the target election policy according to the NLRI without considering the ES identifier.

When the target election policy is determined according to the election policy corresponding to the ES identifier, by configuring different election policies for different CEs, different election policies can be distinguished according to different ES identifiers. In this way, it can be achieved that different target election policies can be determined for different CEs, which improves the flexibility of the election.

Block 303, the DF is elected from the first PE and the second PE by using the target election policy.

Since the target election policy is used for electing a DF from the first PE and the second PE, the first PE may use the target election policy to elect the DF from the first PE and the second PE.

For example, assume that the target election policy is to take the remainder from dividing the VXLAN ID by the number of PEs, the first PE may first determine the VXLAN ID corresponding to the CE and the number of PEs to which the CE is multi-homed, and then calculates the remainder from dividing the VXLAN ID by the number of PEs. Assume that the CE is multi-homed to the PE 102, the PE 103, and the PE 104, the number of PEs is three, and the remainder from dividing the VXLAN ID by the number of PEs is 0, 1, or 2. If the remainder is 0, the PE 102 is elected as the DF; if the remainder is 1, the PE 103 is elected as the DF; if the remainder is 2, the PE 104 is elected as the DF.

For another example, assume that the target election policy is an interface priority policy, and the CE is multi-homed to the PE 102, the PE 103, and the PE 104, the first PE can determine the priorities of the interface connected to the CE on the PE 102, the interface connected to the CE on the PE 103, and the interface connected to the CE on the PE 104. Then, the first PE can elect the PE corresponding to the largest priority as the DF. The first PE may obtain the priority of the interface connected to the CE on the second PE from the NLRI sent by the second PE.

Of course, the target election policy can also be other policies for electing DF, which is not restricted.

Based on the foregoing technical solution, in the example of the present disclosure, the first PE and the second PE may determine the same target election policy by negotiating with each other, and use the target election policy to elect the DF from the first PE and the second PE. In this way, since all PEs use the same target election policy to elect the DFs, the DFs elected by all PEs are the same PE, thus avoiding erroneous DF election results. In addition, when each PE negotiates for the target election policy, the PE may select an appropriate election policy based on the capabilities of the PE, and it is unnecessary to adjust the election policy supported by the PE based on the election policies supported by other PEs. Thus, the autonomy of each PE is greatly enhanced.

Figure 4:
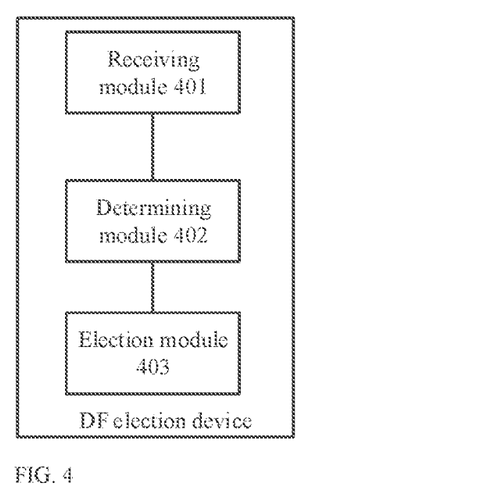
FIG. 4 is a structural diagram of a DF election device according to an example of the present disclosure.

Based on the same application concept as the above method, in an example of the present disclosure, a DF election device is further provided, which can be applied to a first PE of a plurality of PEs providing multi-homing access for a CE. FIG. 4 shows a structural diagram of the device, the device may include: a receiving module 401, a determining module 402, and an election module 403.

The receiving module 401 is configured to receive network layer reachability information, NLRI, sent by a second PE of the PEs, and parse out, from the NLRI, a first election policy set supported by the second PE, and a first priority corresponding to each election policy in the first election policy set.

The determining module 402 is configured to determine a target election policy by using a second election policy set supported by the first PE, a second priority corresponding to each election policy in the second election policy set, the first election policy set supported by the second PE, and the first priority corresponding to each election policy in the first election policy set.

The election module 403 is configured to elect a DF from the first PE and the second PE based on the target election policy.

In an example, the determining module 402 is specifically configured to determine an intersection of the second election policy set and the first election policy set; and determine, for each election policy in the intersection, a target priority corresponding to the election policy by using the first priority and the second priority corresponding to the election policy; determine an election policy with the highest target priority as the target election policy.

In an example, the determining module 402 is further configured to: when the intersection of the second election policy set and the first election policy set is empty, obtain a specified election policy, and determine the specified election policy as the target election policy.

In an example, the NLRL also carries an ES identifier of a CE connected to the second PE, and the determining module 402 obtains an election policy corresponding to the ES identifier from election policies supported by the first PE, and adds the obtained election policy into the second election policy set.

In an example, the DF election device may also include (not shown in the figure): an obtaining module and a sending module.

The obtaining module is configured to obtain the second election policy set supported by the first PE, and the second priority corresponding to each election policy in the second election policy set.

The sending module is configured to send NLRL to the second PE, where the NLRI carries an extended community attribute indicating the second election policy set and the second priority corresponding to each election policy of the second election policy set.

In an example, the NLRI includes at least one extended community attribute, where the number of extended community attributes is the same as the number of the election policies in the first election policy set, and each of the election policies corresponds to an extended community attribute. The extended community attribute corresponding to the election policy includes a DF type field and a DF priority field, where the DF type field is used to indicate the type of the election policy; the DF priority field is used to indicate the first priority corresponding to the election policy.

Figure 5:
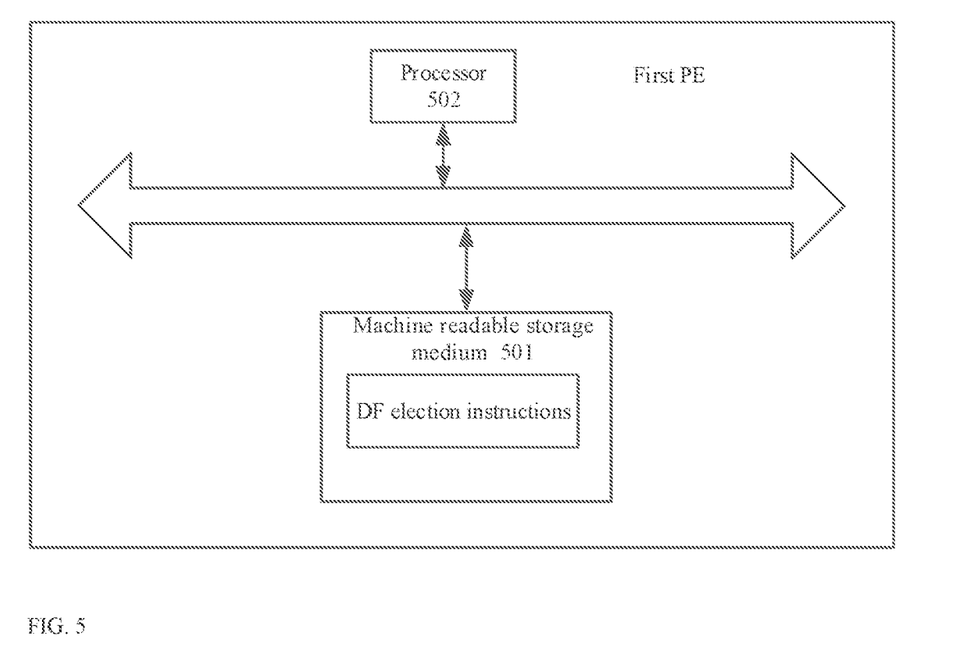
FIG. 5 is a hardware structural diagram of a PE according to an example of the present disclosure.

FIG. 5 specifically illustrates, on a hardware level, a hardware architecture diagram of the first PE provided in the examples of the present disclosure. The PE may include a machine-readable storage medium 501 and a processor 502.

the machine-readable storage medium 501 is configured to store instruction codes. The machine-readable storage medium 501, for example, is a non-transitory machine-readable storage medium.

the processor 502 is configured to communicate with the machine-readable storage medium 501, read and execute the instruction codes stored in the machine readable storage medium 501 to implement the DF election operation disclosed in the above example of the present disclosure.

Here, the machine-readable storage medium may be any electronic, magnetic, optical, or other physical storage device that can contain or store information such as executable instructions, data, and so forth. For example, the machine readable storage medium can be volatile or non-volatile, including: RAM (Radom Access Memory), flash memory, storage drive (such as a hard drive), solid state drive, any type of storage disk (such as a compact disc, dvd, etc.), or a similar storage medium, or a combination thereof.

The system, device, module or unit set forth in the above examples may be implemented by a computer chip or an entity, or by a product having a certain function. A typical device implementation may be a computer, and the specific form of the computer may be a personal computer, a laptop computer, a cellular phone, a camera phone, a smart phone, a personal digital assistant, a media player, a navigation device, an email transceiver, and a game control, a tablet, a wearable device, any of these devices or a combination thereof.

For the convenience of description, the above device may be described as being separately divided into various units by function. Of course, the functions of each unit may be implemented in the same software/hardware or a plurality of softwares/hardwares when implementing the present disclosure.

Those skilled in the art will appreciate that the examples of the present disclosure can be provided as a method, system, or computer program product. Thus, the application can take the form of an entirely hardware example, an entirely software example, or a combination of software and hardware examples. Moreover, examples of the present disclosure can take the form of a computer program product embodied on one or more computer usable storage media (including but not limited to disk storage, CD-ROM, optical storage, etc.) including computer usable program codes.

The present disclosure is described with reference to flowcharts and/or block diagrams of methods, apparatus (systems), and computer program products according to examples of the present disclosure. It will be understood that each flow and/or block of the flowchart or the combination thereof may be implemented by computer program instructions. These computer program instructions can be provided to a processor of a general purpose computer, special purpose computer, embedded processor, or other programmable data processing device to produce a machine for generating a means by instructions executed by a computer or a processor of other programmable data processing device, wherein the means is used for implementing the functions specified in one or more flows of the flowchart or in a block or blocks of the flowchart.

Moreover, these computer program instructions can also be stored in a computer readable memory that can direct a computer or other programmable data processing device to operate in a particular manner, such that the instructions stored in the computer readable memory produce an article of manufacture comprising the instruction means. The instruction means implements the functions specified in one or more flows of the flowchart or in one or more blocks of the block diagram.

These computer program instructions can also be loaded onto a computer or other programmable data processing device such that a series of operational steps are performed on the computer or other programmable device to produce computer-implemented processing. Therefore, the instructions executed on the computer or other programmable device provide steps for implementing the functions specified in one or more flows of a flowchart and/or in one or more blocks of a block diagram.

The above descriptions are only examples of the present disclosure and are not intended to limit the disclosure. Various changes and modifications can be made to the present disclosure by those skilled in the art. Any modifications, equivalents, improvements, etc. made within the spirit and scope of the present disclosure are intended to be included within the scope of the appended claims.

The invention claimed is:

1. A method of electing a designated forwarder DF, applied to a first provider edge PE in a plurality of PEs that provide a multi-homing access for a customer edge CE, the method comprising:
   receiving network layer reachability information NLRI sent by a second PE of the PEs,
   parsing out, from the NLRI, a first election policy set supported by the second PE, and a first priority corresponding to each election policy in the first election policy set;
   determining a target election policy by using a second election policy set supported by the first PE, a second priority corresponding to each election policy in the second election policy set, the first election policy set supported by the second PE, and the first priority corresponding to each election policy in the first election policy set;
   electing a DF from the first PE and the second PE based on the target election policy,
   wherein determining the target election policy by using the second election policy set supported by the first PE, the second priority corresponding to each election policy in the second election policy set, the first election policy set supported by the second PE, and the first priority corresponding to each election policy in the first election policy set, comprises:
      determining an intersection of the first election policy set and the second election policy set;
      determining, for each election policy in the intersection, a target priority corresponding to the election policy by using the first priority and the second priority corresponding to the election policy; and
      determining an election policy with highest target priority as the target election policy.

2. The method according to claim 1, further comprising:
   when the intersection of the first election policy set and the second election policy set is empty, obtaining a specified election policy, and determining the specified election policy as the target election policy.

3. The method according to claim 1, wherein, the NLRL carries an Ethernet Segment ES identifier of a CE connected to the second PE, and the method further comprises:
   before determining the target election policy, obtaining an election policy corresponding to the ES identifier from election policies supported by the first PE, and adding the obtained election policy into the second election policy set.

4. The method according to claim 1, further comprising:
   obtaining the second election policy set supported by the first PE, and the second priority corresponding to each election policy in the second election policy set; and
   sending NLRI to the second PE, wherein, the NLRI carries an extended community attribute indicating the second election policy set and the second priority corresponding to each election policy of the second election policy set.

5. The method according to claim 1, wherein,
   the NLRI comprises at least one extended community attribute, wherein, a number of the at least one extended community attribute is same as a number of the election policies in the first election policy set, and each of the election policies corresponds to an extended community attribute; and
   the extended community attribute corresponding to the election policy comprises a DF type field and a DF priority field
   wherein, the DF type field indicates a type of the election policy, and the DF priority field indicates a first priority corresponding to the election policy.

6. A device for electing a designated forwarder DF, applied to a first provider edge PE in a plurality of PEs that provide a multi-homing access for a customer edge CE, and comprising:
   a processor; and
   a non-transitory machine-readable storage medium storing machine-executable instructions, wherein the machine-executable instructions cause the processor to:
   receive network layer reachability information NLRI sent by a second PE of the PEs,
   parse out, from the NLRI, a first election policy set supported by the second PE, and a first priority corresponding to each election policy in the first election policy set;
   determine a target election policy by using a second election policy set supported by the first PE, a second priority corresponding to each election policy in the second election policy set, the first election policy set supported by the second PE, and the first priority corresponding to each election policy in the first election policy set; and
   elect a DF from the first PE and the second PE based on the target election policy,
   wherein, when determining the target election policy by using the second election policy set supported by the first PE, the second priority corresponding to each election policy in the second election policy set, the first election policy set supported by the second PE, and the first priority corresponding to each election policy in the first election policy set, the machine executable instructions further cause the processor to:
      determine an intersection of the first election policy set and the second election policy set;
      determine, for each election policy in the intersection, a target priority corresponding to the election policy by using the first priority and the second priority corresponding to the election policy; and determine an election policy with highest priority as the target election policy.

7. The device according to claim 6, wherein, the machine executable instructions further cause the processor to:
when the intersection of the first election policy set and the second election policy set is empty, obtain a specified election policy, and determine the specified election policy as the target election policy.

8. The device according to claim 6, wherein, the NLRL carries an Ethernet Segment ES identifier of a CE connected to the second PE, the machine executable instructions further causing the processor to:
before determining the target election policy, obtain an election policy corresponding to the ES identifier from election policies supported by the first PE, and add the obtained election policy into the second election policy set.

9. The device according to claim 6, wherein, the machine executable instructions further cause the processor to:
obtain the second election policy set supported by the first PE, and the second priority corresponding to each election policy in the second election policy set; and
send NLRI to the second PE, wherein, the NLRI carries an extended community attribute indicating the second election policy set and the second priority corresponding to each election policy of the second election policy set.

10. The device according to claim 6, wherein,
the NLRI comprises at least one extended community attribute, wherein, a number of the at least one extended community attribute is same as a number of the election policies in the first election policy set, and each of the election policies corresponds to an extended community attribute; and the extended community attribute corresponding to the election policy comprises a DF type field and a DF priority field;

wherein, the DF type field indicates a type of the election policy, and the DF priority field indicates a first priority corresponding to the election policy.

* * * * *